United States Patent
Yeh

(10) Patent No.: US 9,141,530 B2
(45) Date of Patent: Sep. 22, 2015

(54) DATA WRITING METHOD, MEMORY CONTROLLER AND MEMORY STORAGE DEVICE

(75) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 301 days.

(21) Appl. No.: 13/596,075

(22) Filed: Aug. 28, 2012

(65) Prior Publication Data

US 2013/0346674 A1    Dec. 26, 2013

(30) Foreign Application Priority Data

Jun. 26, 2012 (TW) .............................. 101122833 A

(51) Int. Cl.
 *G06F 12/00* (2006.01)
 *G06F 12/02* (2006.01)
(52) U.S. Cl.
 CPC .... *G06F 12/0246* (2013.01); *G06F 2212/7202* (2013.01)
(58) Field of Classification Search
 CPC ................... G06F 12/0864; G06F 2212/1028; G06F 2212/6082; G06F 12/123
 USPC ......................................................... 711/103
 See application file for complete search history.

(56) References Cited

U.S. PATENT DOCUMENTS

| | | | |
|---|---|---|---|
| 6,480,936 B1* | 11/2002 | Ban et al. ........................ | 711/118 |
| 8,078,848 B2* | 12/2011 | Asnaashari ..................... | 712/225 |
| 2008/0109589 A1* | 5/2008 | Honda ........................... | 711/103 |
| 2009/0113112 A1* | 4/2009 | Ye et al. ......................... | 711/102 |
| 2009/0327590 A1* | 12/2009 | Moshayedi ..................... | 711/103 |
| 2010/0122016 A1* | 5/2010 | Marotta et al. ................. | 711/103 |
| 2012/0059992 A1* | 3/2012 | Radke et al. ................... | 711/114 |
| 2012/0159054 A1* | 6/2012 | Cheon et al. ................... | 711/103 |
| 2012/0191900 A1* | 7/2012 | Kunimatsu et al. ............ | 711/103 |
| 2012/0240012 A1* | 9/2012 | Weathers et al. .............. | 714/773 |

\* cited by examiner

*Primary Examiner* — Charles Rones
*Assistant Examiner* — Nanci Wong
(74) *Attorney, Agent, or Firm* — Jianq Chyun IP Office

(57) ABSTRACT

A data writing method for controlling a rewritable non-volatile memory module having a plurality of physical erase units is provided. The method includes: receiving a write command which instructs writing data to a first logical address, wherein the first logical address is mapped to a second physical erase unit; determining whether the second physical erase unit is in a sequential writing state which represents that the physical programming units over a predetermined ratio in the second physical erasing unit have been successively written sequentially within a predetermined time; if yes, writing the data into a third physical erasing unit in a first programming mode, wherein the first programming mode represents that a plurality of upper physical programming units are non-programmable. Accordingly, the data writing rate is increased.

24 Claims, 12 Drawing Sheets

DATA WRITING METHOD, MEMORY CONTROLLER AND MEMORY STORAGE DEVICE

CROSS-REFERENCE TO RELATED APPLICATION

This application claims the priority benefit of Taiwan application serial no. 101122833, filed on Jun. 26, 2012. The entirety of the above-mentioned patent application is hereby incorporated by reference herein and made a part of this specification.

BACKGROUND

1. Technical Field

The present invention relates to a data writing method for a rewritable non-volatile memory module, a memory controller and a memory storage device.

2. Description of Related Art

The rapid growth in the popularity of digital cameras, cellular phones, and MP3 players in recent years has brought about the escalated demand for storage media by consumers. Since a rewritable non-volatile memory module (e.g., a flash memory) has several characteristics such as non-volatility of data, low power consumption, small size and non-mechanical structure, the rewritable non-volatile memory is the most suitable memory to be adopted in a portable multimedia device mentioned above.

Generally, the rewritable non-volatile memory module is utilized with a host system. The host system issues a command for accessing logical addresses to the rewritable non-volatile memory module to read or write data. However, the host system may partition a specific area from the logic addresses, the specific area may be configured for backup or dumping data. When the host system access the specific area, multiple write commands may be issued to access sequential logical addresses. If there is a large amount of data to backup or dump, it is obvious that the writing rate will affect the effectiveness of the host system. Therefore, how to write data with sequential logical addresses to the rewritable non-volatile memory module is a topic that concerns researchers of the field.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

Accordingly, the embodiments of the present invention are directed to a data writing method, a memory controller, and a memory storage device, which increase the data writing rate.

According to an exemplary embodiment of the present invention, a data writing method is provided for controlling the rewriteable non-volatile memory module. The rewriteable non-volatile memory module includes a plurality of physical erasing units, each of the physical erasing units includes a plurality of physical programming unit groups, and each of the physical programming unit groups includes a plurality of physical programming units. The physical programming units of each of the programming unit groups include a lower physical programming unit and an upper physical programming unit. A plurality of logical addresses is mapped to a plurality of first physical erasing units of the physical erasing units. The data writing method includes: receiving a first write command which instructs writing data to at least one first logical address of the logical addresses, wherein the first logical address is mapped to a second physical erasing unit of the first physical erasing units. The method further includes: determining whether the second physical erasing unit is in a sequential writing state which represents that the physical programming units over a predetermined ratio in the second physical erasing unit have been programmed sequentially within a predetermined time. If the second physical erasing unit is in the sequential writing state, the data is written into a third physical erasing unit in a first programming mode, wherein the first programming mode represents the upper physical programming unit is non-programmable.

Alternatively, a memory storage device is provided according to an exemplary embodiment of the present invention, which includes a connector, a rewritable non-volatile memory module and a memory controller. The connector is coupled to a host system. The rewritable non-volatile memory module includes a plurality of physical erasing units, wherein each of the physical erasing unit includes a plurality of physical programming unit groups, each of the physical programming unit group includes a plurality of physical programming units, the physical programming units of each of the physical programming unit groups include a lower physical programming unit and a upper physical programming unit. A plurality of first logical addresses is mapped to a plurality of first physical erasing units. The memory controller is coupled to the connector and the rewritable non-volatile memory module, and configured to receive a first write command. The first write command instructs writing data to at least one first logical address, and the first logical address is mapped to a second physical erasing unit of the first physical erasing units. The memory controller is further configured to determine whether the second physical erasing unit is in a sequential writing state. The sequential writing state represents that the physical programming units over a predetermined ratio in the second physical erasing unit have been programmed sequentially within a predetermined time. If the second physical erasing unit is in the sequential writing state, the memory controller is further configured to write the data into a third physical erasing unit in the first programming mode, wherein the first programming mode represents that the upper physical programming units are non-programmable.

Alternatively, a memory controller is provided according to an exemplary embodiment of the present invention, which includes a host interface, a memory interface, and a memory management circuit. The host interface is configured to couple to the host system. The memory interface is configured to couple to a rewritable non-volatile memory module. The rewritable non-volatile memory module includes a plurality of physical erasing units, wherein each of the physical erasing units includes a plurality of physical programming unit groups, each of the physical programming unit groups includes a plurality of physical programming units, the physical programming units of each of the physical programming unit groups includes a lower physical programming unit and a upper physical programming unit. A plurality of first logical addresses is mapped to a plurality of first physical erasing units. The memory management circuit is coupled to the connector and the rewritable non-volatile memory module, and configured to receive a first write command. The first write command instructs writing data to at least one first logical address, and the first logical address is mapped to a second physical erasing unit of the first physical erasing units. The memory management circuit is further configured to determine whether the second physical erasing unit is in a sequential writing state. The sequential writing state represents that the physical programming units over a predetermined ratio in the second physical erasing unit has been programmed sequentially within a predetermined time. If the second physical erasing unit is in the sequential writing state, the memory management circuit is further configured to write the data into a third physical erasing unit in a first programming mode. The first programming mode represents that the upper physical programming unit is non-programmable.

Base on the above, the data writing method, the memory controller and the memory management circuit are provided according to the embodiments of the present invention, which increase the data writing rate when the data to be written by the host system have logical addresses in a sequence.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned features and advantages of the present invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENT

Figure 1A:
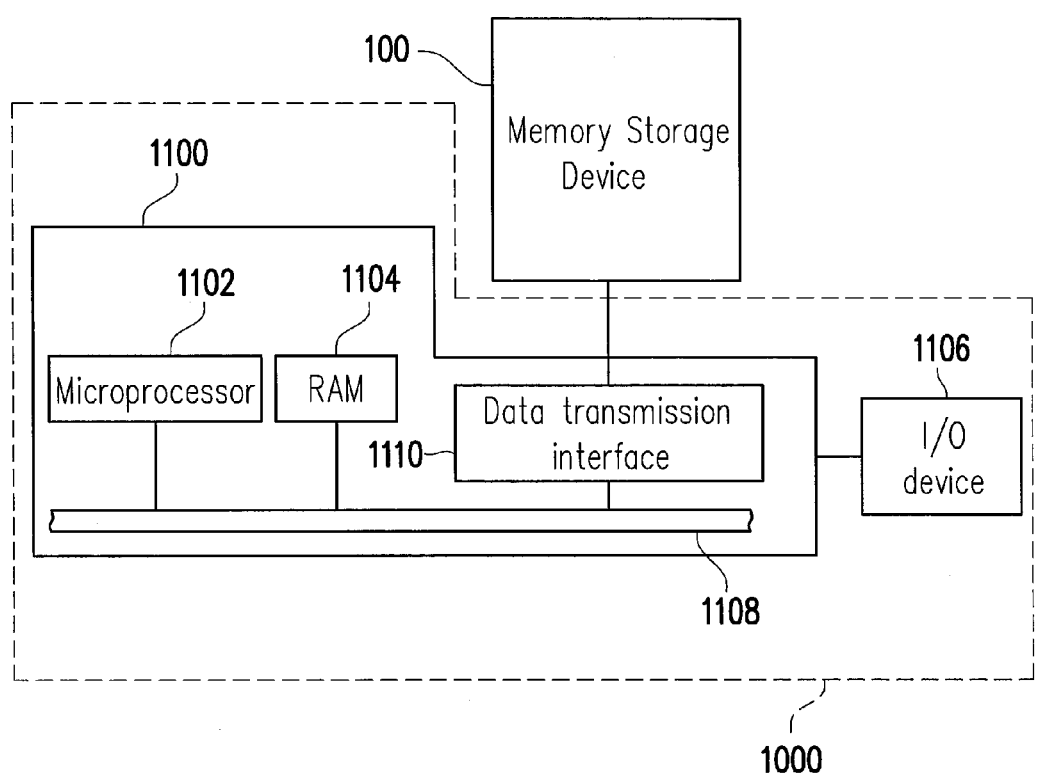
FIG. 1A illustrates a host system and a memory storage device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

The embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also referred to as a memory storage system) includes a rewriteable non-volatile memory and a controller (also referred to as control circuit). Usually the memory storage device is used together with a host system, as to enable the host system to write data to the memory storage device or read data from the memory storage device.

FIG. 1A illustrates a host system and a memory storage device according to an exemplary embodiment.

Figure 1B:
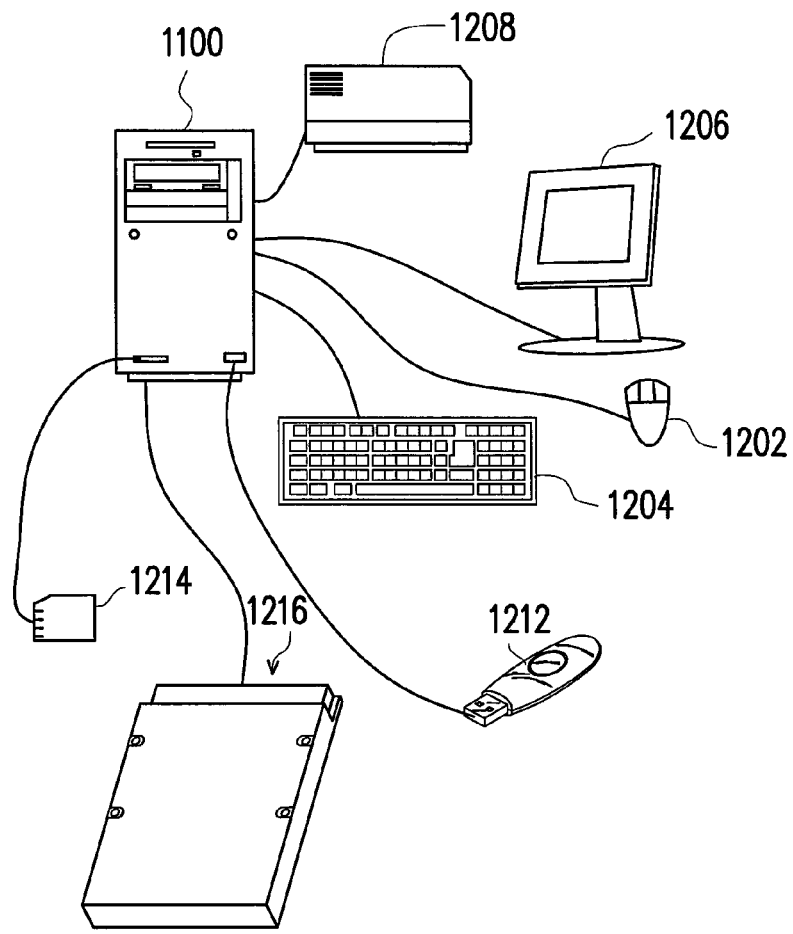
FIG. 1B is a schematic diagram illustrating a computer, an input/output (I/O) device, and a memory storage device according to an exemplary embodiment.

Referring to FIG. 1A, a host system 1000 in most cases includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the devices illustrated in FIG. 1B are not be construed as limitations to the present disclosure, and the I/O device 1106 may include other devices as well.

In the exemplary embodiment of the present invention, the memory storage device 100 is coupled to other devices of the host system 1000 through the data transmission interface 1110. By operating the microprocessor 1102, the RAM 1104, and the I/O device 1106, the data can be written into or read from the memory storage device 100. For instance, the memory storage device 100 may be a non-volatile memory storage device, such as a flash drive 1212, a memory card 1214, or a solid state drive (SSD) 1216 as illustrated in FIG. 1B.

Figure 1C:
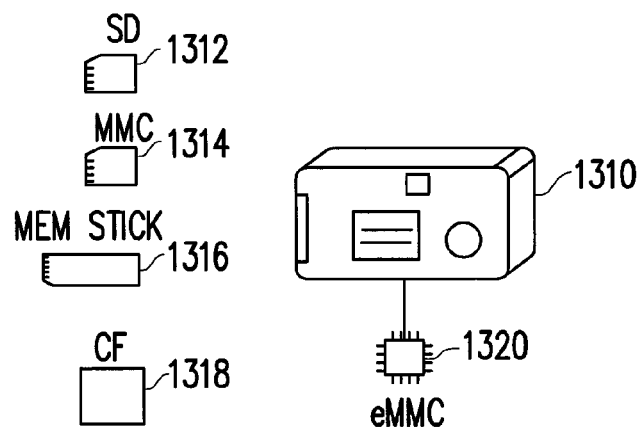
FIG. 1C is a schematic diagram illustrating a host system and a memory storage device according to an exemplary embodiment.

Generally, the host system 1000 can substantially be any systems that operate together with the memory storage device 100 for storing data. Although the host system 1000 is described as a computer system in the present exemplary embodiment, the host system 1000 in another exemplary embodiment may be a digital camera, a video camera, a communication device, an audio player, a video player, and so on. For instance, if the host system is a digital camera (video camera) 1310, the rewritable non-volatile memory storage device is an SD card 1312, an MMC card 1314, a memory stick 1316, a CF card 1318 or an embedded storage device 1320 (as shown in FIG. 1C). The embedded storage device 1320 includes an embedded MMC (eMMC). It should be noted that the eMMC is directly coupled to a substrate of the host system.

Figure 2A:
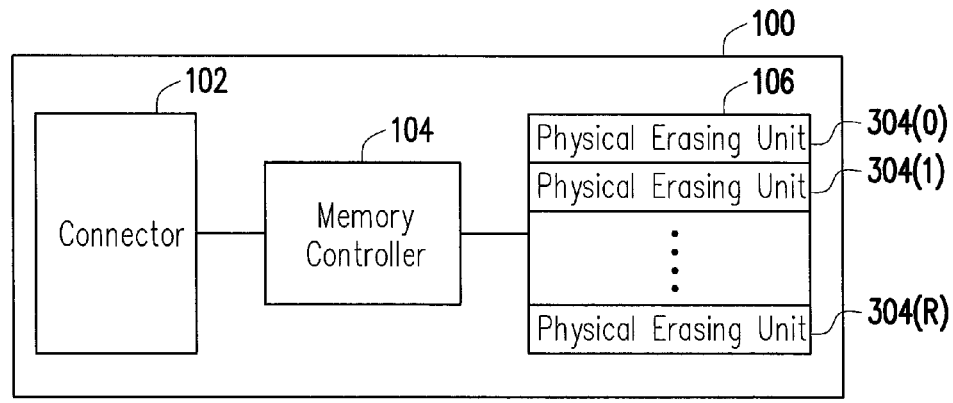
FIG. 2A is a schematic block diagram illustrating the memory storage device illustrated in FIG. 1A.

FIG. 2A is a schematic block diagram illustrating the memory storage device illustrated in FIG. 1A.

Referring to FIG. 2, the memory storage device 100 includes a connector 102, a memory controller 104, and a rewritable non-volatile memory module 106.

In the present exemplary embodiment, the connector 102 complies with the serial advanced technology attachment (SATA) standard. It should be noted that the embodiment of the present invention is not limited thereto. The connector 102 may comply with the parallel advanced technology attachment (PATA) standard, institute of Electrical and electronic Engineers (IEEE) 1394 standard, the peripheral component interconnect express (PCI-express) standard, the universal serial bus (USB) standard, the secure digital (SD) interface standard, the ultra high speed-I (UHS-I) interface standard, ultra high speed-II (UHS-II) interface standard, the memory stick (MS) interface standard, the multi media card (MMC) interface standard, the embedded multimedia card (eMMC) interface standard, universal flash storage (UFS) interface standard, compact flash (CF) interface standard, integrated device electronics (IDE) standard or other appropriate standards.

The memory controller 104 is configured to execute a plurality of logic gates or control commands which are implemented in a hardware form or in a firmware form, and to perform the operations such as data writing, reading or erasing in the rewritable non-volatile memory module 106 according to the command of the host system 1000.

The rewritable non-volatile memory module 106 is coupled to the memory controller 104, and is configured to store the data written by the host system 1000. The rewritable non-volatile memory module 106 includes a plurality of physical erasing units 304(0)-304(R). For instance, the physical erasing units 304(0)-304(R) may belong to the same memory die or different memory dies. Each of the physical erasing units has a plurality of physical programming units, respectively. The physical programming units belonging to the same physical erasing unit can be written individually as well as erased simultaneously. For instance, each of the physical erasing units is composed of 128 physical programming units. It should be understood that the embodiment of the present invention is not limited thereto. Each of the physical erasing units can be composed by 64 physical programming units, 256 physical programming units, or any other number of physical programming units.

Specifically, the physical erasing unit is a minimum unit for erasing operation. That is to say, each of the physical erasing units has a minimum number of memory cells for being erased altogether. The physical programming unit is a minimum unit for programming operation. In other words, the physical programming unit is the minimum unit for writing data. Each physical programming unit usually includes a data bit area and a redundant bit area. The data bit area includes a plurality of physical accessing addresses, and is configured to store user data. The redundant bit area is configured to store system data (e.g., control information and error checking and correcting (ECC) codes). In the exemplary embodiment, the data bit area of each physical programming unit includes 4 physical accessing addresses, and a size of a physical accessing address is 512 byte (B). However, in other exemplary embodiment, the data bit area may include 8, 16, or more or less physical accessing addresses. The embodiment of the present invention does not limit the size and number of the physical accessing addresses. For instance, the physical erasing unit is a physical block, and the physical programming unit is a physical page or a physical sector.

In the present exemplary embodiment, the rewritable non-volatile memory module 106 is a Multi Level Cell (MLC) NAND flash memory module. In other words, at least two bits of data can be stored in a memory cell. That is to say, each of the physical erasing units includes a plurality of physical programming unit groups, each of the physical programming unit groups includes a plurality of physical programming units, and the physical programming units of each of the physical programming units group include a lower physical programming unit and an upper physical programming unit. Wherein a programming speed of the lower physical programming units is greater than the programming speed of the upper physical programming units. However, the embodiment of the present invention is not limited thereto. The rewritable non-volatile memory module 106 may also be a Single Level Cell (SLC) NAND flash memory module, a Trinary Level Cell (TLC) NAND flash memory module, other flash memory modules or other memory modules with the same property.

Figure 2B:
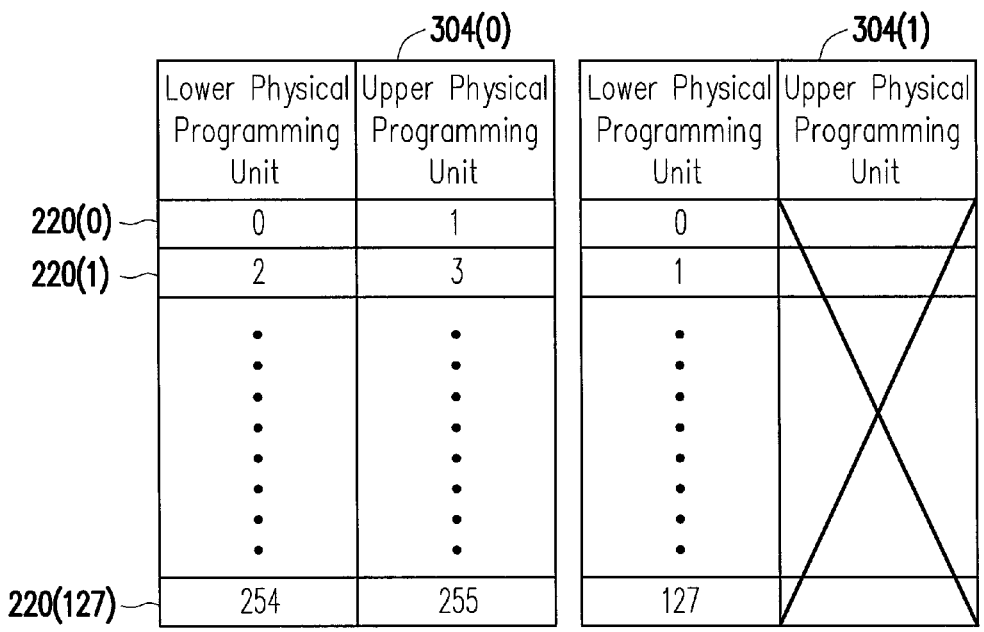
FIG. 2B is a diagram illustrating an example of a first programming mode and a second programming mode according to an exemplary embodiment.

FIG. 2B is a diagram illustrating an example of the first programming mode and a second programming mode according to an exemplary embodiment.

In the present exemplary embodiment, a programming mode of a physical erasing unit can include at least two modes, that is the first programming mode and the second programming mode. The first programming mode represents that the good upper physical programming units are programmable but not to be programmed. In other words, the first programming mode represents that the upper physical programming units are non-programmable. The second programming mode represents that the physical programming units in the physical programming unit groups are programmable. In other words, the second programming mode represents that the upper physical programming units are programmable and could be programmed. For instance, referring to FIG. 2B, the physical erasing unit 304(0) is operated in the second programming mode, and the physical erasing unit 304(1) is operated in the first programming mode. The physical erasing unit 304(0) includes a plurality of physical programming unit groups 220(0)-220(127), wherein the physical programming units (that is, the physical programming units with physical addresses 0-255) are programmable. Alternatively, the upper physical programming units in the physical erasing unit 304(1) are non-programmable. In other words, only the lower physical programming units (that is, the physical programming units with the physical address 0-127) are programmable. When a physical erasing unit operates in the first programming mode, an upper limit for the erase count is a first threshold value. When a physical erasing unit operates in the second programming mode, an upper limit for the erase count is a second threshold value. In addition, the second threshold value is greater than the first threshold value. In the present exemplary embodiment, the data can be written to each of the physical erasing units 304(0)-304(R) in the first programming mode or the second programming mode.

Figure 3:
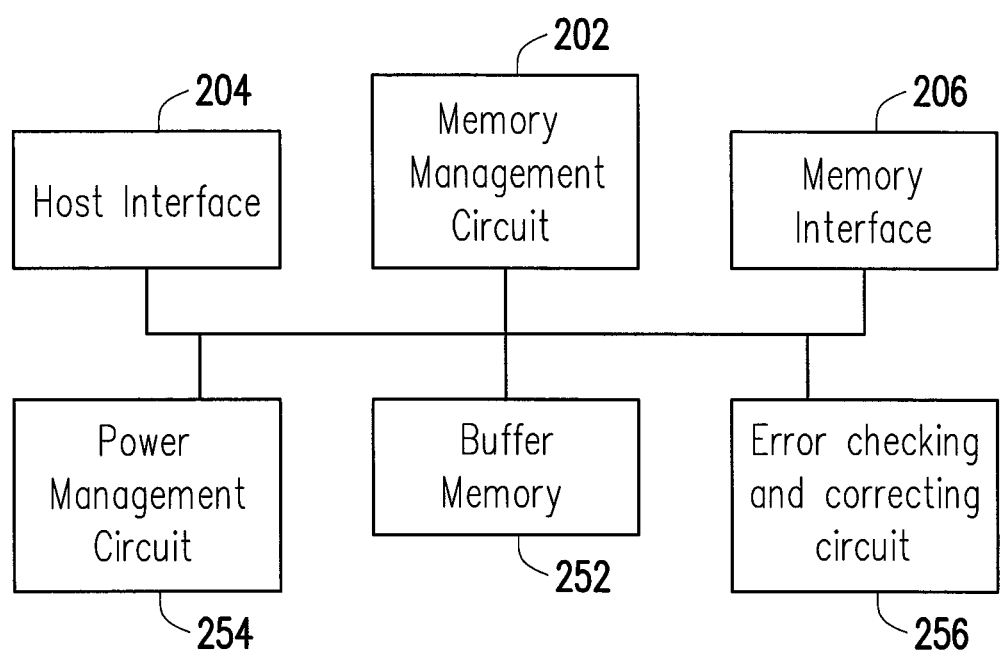
FIG. 3 is a schematic block diagram illustrating a memory controller according to an exemplary embodiment.

FIG. 3 is a schematic block diagram illustrating a memory controller according to an exemplary embodiment.

Referring to FIG. 3, the memory controller 104 includes a memory management circuit 202, a host interface 204 and a memory interface 206.

The memory management circuit 202 is configured to control the overall operation of the memory controller 104. Particularly, the memory management circuit 202 has a plurality of control commands. When the memory storage device 100 is operating, the control commands are executed to write, read, and erase data.

In the present exemplary embodiment, the control commands of the memory management circuit 202 are implemented in a firmware form. For instance, the memory management circuit 202 includes a microprocessor unit (not shown) and a read-only memory (ROM, not shown), and the control commands are recorded in the read-only memory. When the memory storage device 100 is operated, the control commands are executed by a microprocessor unit to write, read, and erase data.

In another exemplary embodiment of the present invention, the control commands of the memory management circuit 202 may also be stored in a specific area (e.g., a system block in a memory module exclusively used for storing system data) of the rewritable non-volatile memory module 106 as a programming code. Furthermore, the memory management circuit 202 includes a microprocessor unit (not shown), a read-only memory (ROM, not shown) and a random access memory (not shown). Particularly, the ROM has a driving code, and when the memory controller 104 is enabled, the microprocessor unit first executes the driving code to load the control commands from the rewritable non-volatile memory module 106 into the RAM of the memory management circuit 202. The microprocessor unit then executes the control instructions to write, read, and erase data.

Furthermore, as in another exemplary embodiment, the control commands in the memory management circuit 202 are implemented in a hardware form. For instance, the memory management circuit 202 includes a microcontroller, a memory management unit, a memory writing unit, a memory reading unit, a memory erasing unit and a data processing unit. The memory management unit, the memory writing unit, the memory reading unit, the memory erasing unit and the data processing unit are coupled to the microcontroller. Wherein, the memory management unit is adopted to manage the physical erasing units of the rewritable non-volatile memory module 106, the memory writing unit is configured to issue the write command to the rewritable non-volatile memory module 106 in order to write the data into the rewritable non-volatile memory module 106, the memory reading unit is configured to issue a read command to the rewritable non-volatile memory module 106 in order to read the data from the rewritable non-volatile memory module 106, the memory erasing unit is adopted to issue a erase command to the rewritable non-volatile memory module 106 in order to erase the data in the rewritable non-volatile memory module 106, and the data processing unit is configured to process the data which is intended to write into the rewritable non-volatile memory module 106 or the data read from the rewritable non-volatile memory module 106.

The host interface 204 is coupled to the memory management circuit 202, and configured to receive and identify the commands and the data transmitted by the host system 1000. Namely, the commands and data transmitted by the host system 1000 are transmitted to the memory management circuit 202 through the host interface 204. In the present exemplary embodiment, the host interface 204 complies with the SATA standard. However, the invention is not limited thereto, and the host interface 204 can also comply with the PATA standard, the IEEE 1394 standard, the PCI Express standard, the USB standard, the SD standard, the MS standard, the MMC standard, the CF standard, the IDE standard, or any other appropriate data transmission standard.

The memory interface 206 is coupled to the memory management circuit 202, configured to access the rewritable non-volatile memory module 106. In other words, the data intended to be written to the rewritable non-volatile memory module 106 is converted to an acceptable format for the rewritable non-volatile memory module 106 through the memory interface 206.

In an exemplary embodiment of the invention, the memory controller 104 further includes a buffer memory 252, a power management circuit 254 and an error checking and correcting circuit 256.

The buffer memory 252 is coupled to the memory management circuit 202 and configured to temporarily store the data and commands from the host system 1000 or the data from the rewritable non-volatile memory module 106.

The power management circuit 254 is coupled to the memory management circuit 202 and configured to control the power of the memory storage device 100.

The error checking and correcting circuit 256 is coupled to the memory management circuit 202 and configured to execute an error checking and correcting process to assure data correctness. Particularly, when the memory management circuit 202 receives a write command from the host system 1000, the error checking and correcting circuit 256 generates an error checking and correcting code (ECC code) for the data corresponding to the write command, and the memory management circuit 202 writes the data corresponding to the write command and the corresponding ECC code into the rewritable non-volatile memory module 106. Afterwards, when the memory management circuit 202 reads the data from the rewritable non-volatile memory module 106, the corresponding ECC code is also read simultaneously, and the error checking and correcting circuit 256 executes an error checking and correcting process on the read data according to the ECC code.

Figure 4:
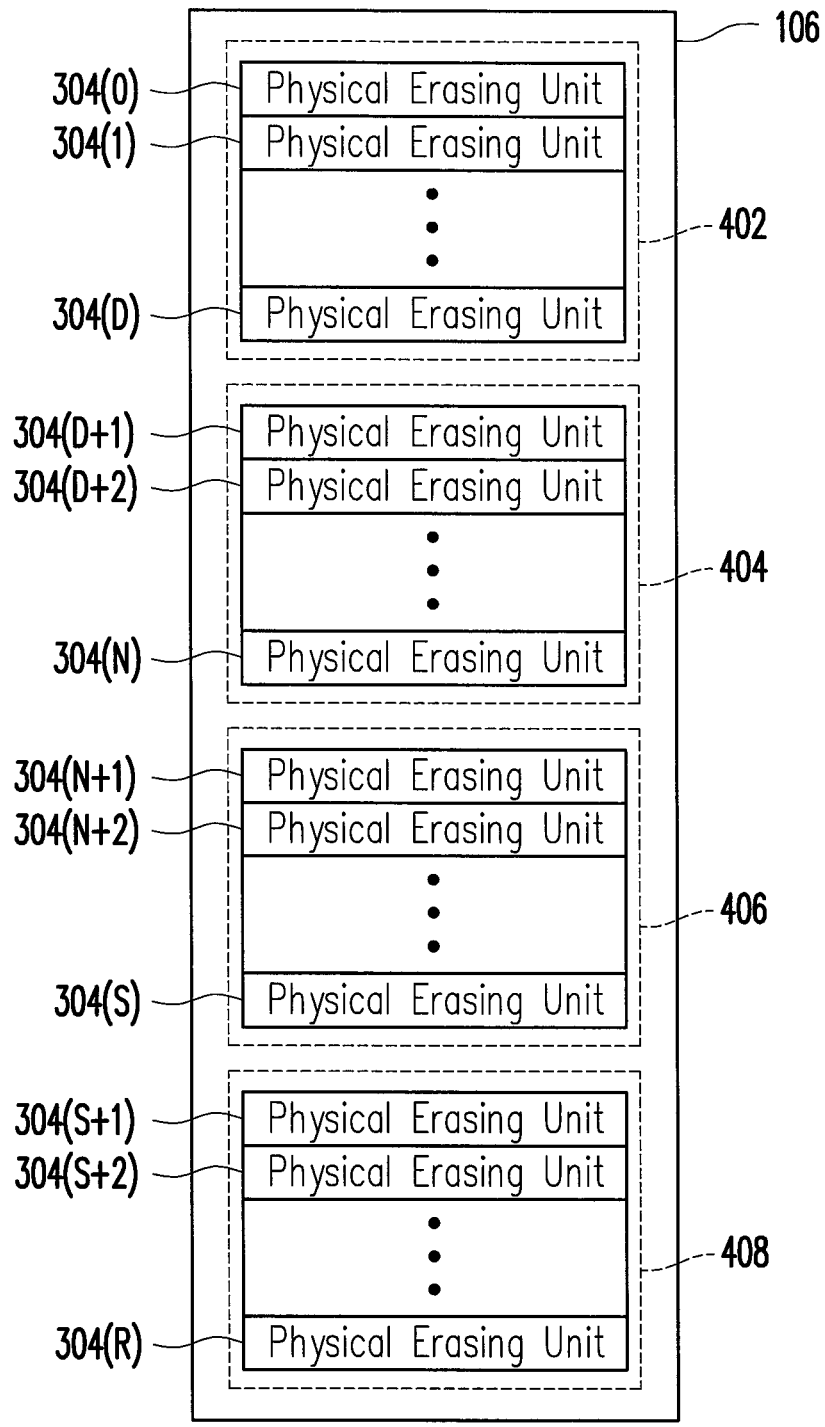
FIG. 4 and FIG. 5 are two schematic diagrams illustrating examples of managing a rewritable non-volatile memory module according to an exemplary embodiment.
Figure 5:
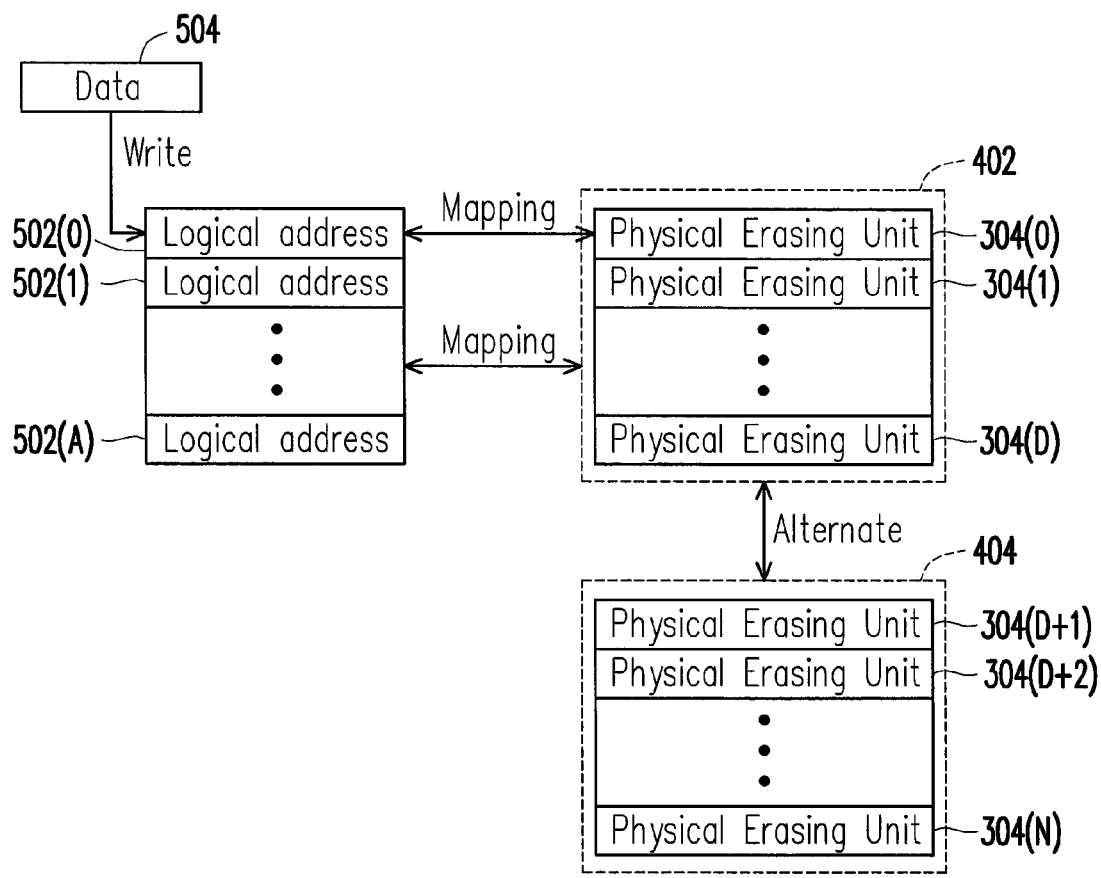

FIG. 4 and FIG. 5 are two schematic diagrams illustrating examples of managing a rewritable non-volatile memory module according to an exemplary embodiment of the present invention.

It should be understood that the terms used herein for describing the operations (for example, "select", "replace", "group", and "alternate", etc) performed on the physical erasing units of the rewriteable non-volatile memory module 106 refer to logical operations performed on these physical blocks. In other word, the physical locations of the physical erasing units in the rewriteable non-volatile memory module are not moved, but the operations of the physical erasing units of the rewriteable non-volatile memory module are performed logically.

Referring to FIG. 4, the physical erasing units 304(0)-304 (R) of the rewritable non-volatile memory module are logically grouped into a plurality of areas, such as a data area 402, a spare area 404, a system area 406, and a replacement area 408. In another exemplary embodiment, the replacement area 408 and the spare area 404 both includes the physical erasing units of invalid data.

The physical erasing units of the data area 402 and the spare area 404 are configured to store data coming from the host system 1000. Particularly, the physical erasing units in the data area 402 are physical erasing units with stored data, and the physical erasing units in the spare area 404 are physical erasing units configured to substitute the physical erasing units of the data area 402. Therefore, the physical erasing units of the spare area 404 are either blank or available physical erasing units (i.e., no data is recorded in the physical erasing units of the spare area 404 or data recorded in the physical erasing units of spare area 404 is marked as invalid data). Namely, an erasing operation are executed on the physical erasing units of the spare area 404, or before a physical erasing unit of the spare area 404 is selected for storing data, the selected physical erasing unit is first erased. Therefore, the physical erasing units of the spare area 404 are available physical erasing units to use.

The physical erasing units logically belonging to the system area 406 are configured to record system data which includes information related to the manufacturer and an example of the memory module, the number of the physical erasing units in a memory chip, the number of the physical programming units in each physical erasing unit, and so forth.

The physical erasing units logically belonging to the replacement area 408 are a plurality of replacement physical units. For instance, a factory of the rewriteable non-volatile memory module sets aside 4% of physical erasing units for replacement. Namely, when the physical erasing units in the data area 402, the spare area 404, and the system area 406 are damaged, the physical erasing units in the replacement area 408 are configured to replace the damaged physical erasing units (i.e., the bad block). Thus, if there are still normal physical erasing units in the replacement area 408 and a physical erasing unit is damaged, the memory management unit 104 selects a normal physical erasing unit from the replacement area 408 for replacing the damaged physical unit. If there are no more normal physical erasing units in the replacement area 408 and a physical erasing unit is damaged, the memory storage device 100 is declared as being in a write-protect status and cannot be utilized for writing data anymore.

Particularly, the numbers of physical erasing units in the data area 402, the spare area 404, the system area 406 and the replacement area 408 are different based on different memory standards. Furthermore, it should be understood that the grouping relationships of the physical erasing units associated to the data area 402, the spare area 404, the system area 406 and the replacement area 408 changes dynamically during the operation of the memory storage device 100. For instance, when a physical erasing unit in the storage area is damaged and replaced by a physical erasing unit in the replacement area, the original physical erasing unit in the replacement area is associated to the storage area.

Referring to FIG. 5, as described above, the physical erasing units of the data area 402 and the spare area 404 stores the data written by the host system 1000 in an alternating method. In the present exemplary embodiment, the memory management circuit 104 configures the logical addresses 502(0)-502(A) to access the data stored in the physical erasing units by the above alternating method. For instance, when the memory storage device 100 is formatted by the operation system 1110 with a file system (e.g., FAT 32), the logical addresses 502(0)-502(A) are mapped to the physical erasing units 304(0)-304(D) of the data area 402, respectively. Herein, the memory management circuit 202 establishes a logical address-physical erasing unit mapping table to record mapping relationships between the logical addresses and the physical erasing units. In an exemplary embodiment, the memory storage capacity corresponding to a logic address is the capacity of a physical erasing unit. At the time, the logical address is referred to as a logical block address. However, in other exemplary embodiment, the memory storage capacity of a logical address can be, for example, the capacity of a physical programming unit. The memory space capacity corresponding to the logical address is not construed as limitations to the embodiment of the present invention.

For instance, when the host system 1000 needs to write a data 504 to the physical erasing unit 304(0), the write command for accessing the logical address 502(0) (also referred to as a first logical address) is issued to the memory management circuit 202. The memory management circuit 202 finds the physical erasing unit 304(0) (also referred to as a second physical erasing unit) is mapped to the logical address 502(0) according to the logical address-physical erasing unit mapping table. In the present exemplary embodiment, the memory management circuit 202 determines whether the physical programming units of the physical erasing unit 304(0) have been programmed sequentially. If yes, this represents that the host system 1000 may be dumping or backing up a large amount of data. At the time, the memory management circuit 202 sets a physical erasing unit (as referred to as a third physical erasing unit) to be written in the first programming mode, and writes the data 504 to the physical erasing unit. The programming rate of the physical erasing units under the first programming mode is faster than the programming rate under the second programming mode. Therefore, the data 504 can be written quickly.

In detail, the memory management circuit 202 first determines whether the received write command (also referred to as a first write command) is a sequential write command. For instance, before the first write command is issued, a second write command is issued to the memory management circuit 202 by the host system 1000. If the logical address to be accessed by the first write command is the same as the logical address to be accessed by the second write command. The memory management circuit 202 determines that the first write command is not a sequential write command. In addition, if the logical address to be accessed by the first write command and the logical address to be accessed by the second write command are mapped to the same physical erasing unit. From the programming order point of view, the physical programming unit to be accessed by the first write command is before the physical programming unit to be accessed by the second write command, and then the memory management circuit 202 also determines that the first write command is not a sequential write command. For the remaining situations, the memory management circuit 202 determines that the first write command is a sequential write command. In another exemplary embodiment, the memory management circuit 202 determines whether the logical address to be accessed by the first write command follows after the logical address to be accessed by the second write command. If yes, the first write command is determined to be the sequential write command. In other words, if a write command is a sequential write command, it indicates that the host system 1000 may be writing a great amount of data having sequential logical addresses. However, the embodiment of the present invention does not limit methods utilized by the memory management circuit 202 to determine whether the received write command is the sequential write command.

If the received write command is not a sequential write command, the memory management circuit 202 writes the data 504 to a physical erasing unit (referred to as a fourth physical erasing unit, such as physical erasing unit 304(D+1)) of the spare area 404. Then, the memory management circuit 202 is able to configure the physical erasing unit 304(D+1) to be written in the first programming mode or the second programming mode. The embodiment of the present invention is not limited thereto. In addition, the memory management circuit 202 records the physical erasing unit 304(D+1) to be not in the sequential writing state. Furthermore, a method of determining whether the physical erasing unit 304(D+1) is written in the first programming mode or the second programming mode can be determined by utilizing one bit in the redundant bit area of one of the physical programming units belonging to the physical erasing unit 304(D+1) (e.g. marked in the lower programming unit) or one bit in the logical address-physical erasing unit mapping table to record the way of writing. Alternatively, another approach is determining whether the data in the upper physical programming units of the physical erasing unit 304(D+1) are all 0xFFFF, if yes, it is determined that the physical erasing unit 304(D+1) has been written in the first programming mode. However the embodiment of the present invention is not limited thereto.

In the present exemplary embodiment, when a physical erasing unit is recorded to be in the sequential writing state, it indicates that the physical programming units over a predetermined ratio in the physical erasing unit have been programmed sequentially within a predetermined time. For instance, the predetermined ratio may be configured as 75%, 100% or the numbers of the programmed physical programming units. However, the embodiment of the present invention is not limited thereto. It should be noted that the predetermined time can be represented by the amount of time that the physical erasing units has been programmed. For instance, if the predetermined time denotes one time, the memory management circuit 202 determines whether the physical erasing unit is in the sequential writing state by determining whether 75% of the physical programming units have been programmed sequentially during the last programming of a physical erasing unit. However, in other exemplary embodiment, the memory management circuit 202 is also able to record the physical erasing unit to be the sequential writing state after 75% of the physical programming units have been programmed sequentially during the last two programming of a physical erasing unit. In an exemplary embodiment, the memory management circuit 202 may utilize a finite state machine or recording table to record whether the physical programming units in a physical erasing unit have been sequentially programmed recently. However, the embodiment of the present invention is not limited thereto. For example, the finite state machine includes a plurality of states, each state record whether the physical programming units of a physical erasing unit have been sequentially programmed n times previously. Wherein, some of the states are the sequential writing states, and the other states are not the sequential writing state. When a physical erasing unit is programmed, the state of the physical erasing unit is switched to another state (or stay in original state) according to whether the physical programming units have been programmed sequentially. Alternatively, the memory management circuit 202 is able to use a timer to learn when a physical erasing unit is programmed last. When a physical erasing unit is in the sequential writing state, this represents that the host system 1000 may be writing data with the sequential logical addresses to a certain specific logical addresses.

It should be noted that each and every physical erasing unit which are configured to store user data are mapped to one of the logical addresses 502(0)-502(A). In another exemplary embodiment, the memory management circuit 202 is able to determine whether a logical address is in the sequential writing state in the logical address level. For example, a logical address includes a plurality of sub-logical addresses (e.g., a physical erasing unit address includes a plurality of logical programming unit addresses). When a logical address is recorded to be in the sequential writing state, this represents that a plurality of sub-logical addresses over a predetermined ratio in the logical address have been programmed sequentially within a predetermined time. In other words, when a physical erasing unit is in the sequential writing state, this represents that the logical addresses which are mapped to the physical erasing unit are also in the sequential writing state. The embodiment of the present invention does not limit the recording of the sequential writing state is in a physical level or a logical level.

After the received write command is determined to be the sequential write command, the memory management circuit 202 determines whether the physical erasing unit 304(0) has been written ever. If the physical erasing unit 304(0) has not been written ever, the memory management circuit 202 writes the data to the physical erasing unit 304(0) under the second programming mode.

If the physical erasing unit 304(0) is determined to be written ever, the memory management circuit 202 further determines whether the physical erasing unit 304(0) has been written in the first programming mode.

If the physical erasing unit 304(0) has been written in the first programming mode, the memory management circuit 202 selects a spare physical erasing unit, and the data 504 is written to the spare physical erasing unit in the first programming mode. When a physical erasing unit is the spare physical erasing unit, this presents that the physical erasing unit does not store any valid data. For instance, the physical erasing units grouped as the spare area 404 are the spare physical erasing units. In order to select a spare physical erasing unit, the memory management circuit 202 determines whether the number of the spare physical erasing unit is not less than a first predetermined number. For example, the first predetermined number is 1. That is, as long as the number of the spare physical erasing unit is not less than 1, then the writing operation can be completed.

Figure 6:
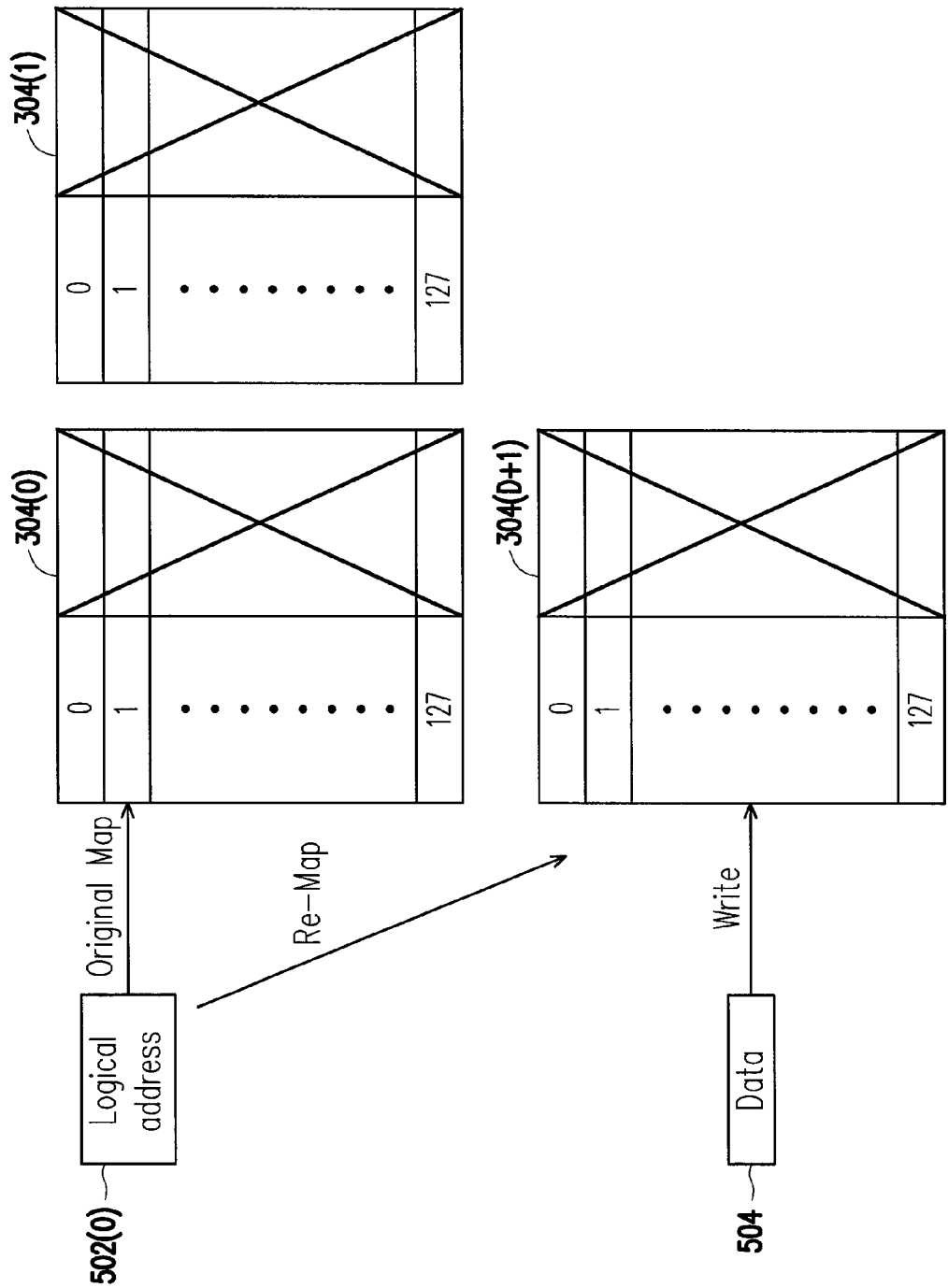
FIG. 6 is a diagram illustrating an example of a writing operation while a second physical erasing unit is written in the first programming mode according to an exemplary embodiment.

FIG. 6 is a diagram illustrating an example of a writing operation while a second physical erasing unit is written in the first programming mode.

Referring to FIG. 6, when the physical erasing unit 304(0) is written in the first programming mode, this represents that the amount of data that is able to be stored is lesser (comparing to the second programming mode.) In the present exemplary embodiment, the memory space capacity corresponding to a logical address 502(0) is the upper physical programming unit and the lower physical programming unit of a physical erasing unit. Therefore, in addition to the physical erasing unit 304(0), a portion of the data belonging to the logical address 502(0) is stored in another physical erasing unit 304(1). Herein, assuming the number of the spare physical erasing unit is not less than the first predetermined number (e.g., a physical erasing unit 304(D+1) is a spare physical erasing unit). The memory management circuit 202 selects the physical erasing unit 304(D+1), and a portion of the data 504 is written to the physical erasing unit 304(D+1) in the first programming mode. In addition, the memory management circuit 202 also sets the physical erasing unit 304(D+1) to be in the sequential writing state. It should be noted that when the physical erasing unit 304(D+1) is full, also represents that the stored data in the physical erasing unit 304(0) are invalid. At the time, the data belonging to the logical address 502(0) is stored in the physical erasing units 304(D+1) and 304(1). Next, the memory management circuit 202 issues an erase command to erase the physical erasing unit 304(0) and writes another portion of the data 504 to the physical erasing unit 304(0). After finishing the steps described above, the data belonging to the logical address 502(0) is stored in the physical erasing units 304(D+1) and 304(0). Additionally, the data stored in the physical erasing unit 304(1) are invalid data. After the physical erasing unit 304(1) is erased, it becomes the spare physical erasing unit which is utilized when the next write command is received.

However, if the number of the spare physical erasing unit is less than the first predetermined number at the time, the memory management circuit 202 performs merging operating or writes the data to the spare physical programming units. Specifically, the memory management circuit 202 copies the valid data of two or more physical erasing units to the same physical erasing unit. Additionally, the memory management circuit 202 executes the erasing operation on the physical erasing units that does not have valid data, the physical erasing units that has been executed with erasing operation becomes the spare physical erasing units. Next, the memory management circuit 202 may writes the data 504 to the spare physical erasing units with the method of the first programming mode as illustrated in FIG. 6. On other hand, when the memory management circuit 202 manages the rewritable non-volatile memory module 106 by utilizing the physical programming unit as a basic unit, there are still the spare physical programming units in some of the physical erasing units even if the number of the spare physical erasing unit is less than the first predetermined number. At the time, the memory management circuit 202 writes the data 504 to any of the spare physical programming units. However, the embodiment of the present invention is not limited thereto.

Alternatively, if the physical erasing unit 304(0) is in the sequential writing state, but not written in the first programming mode, the memory management circuit 202 still writes the data 504 with the method of the first programming mode. However, when a physical erasing unit stores data in the first programming mode, the number of the usable physical programming units is less (comparing to the second programming mode). Therefore, the memory management circuit 202 determines whether the number of the spare physical erasing units in the spare area 404 is not less than a second predetermined number. For instance, the second predetermined number represents the number of the physical programming units in every physical programming unit group, which are 2 in the present exemplary embodiment. However, in other exemplary embodiment, the second predetermined number can be any other positive integers, and the embodiment of the present invention is not limited thereto.

Figure 7:
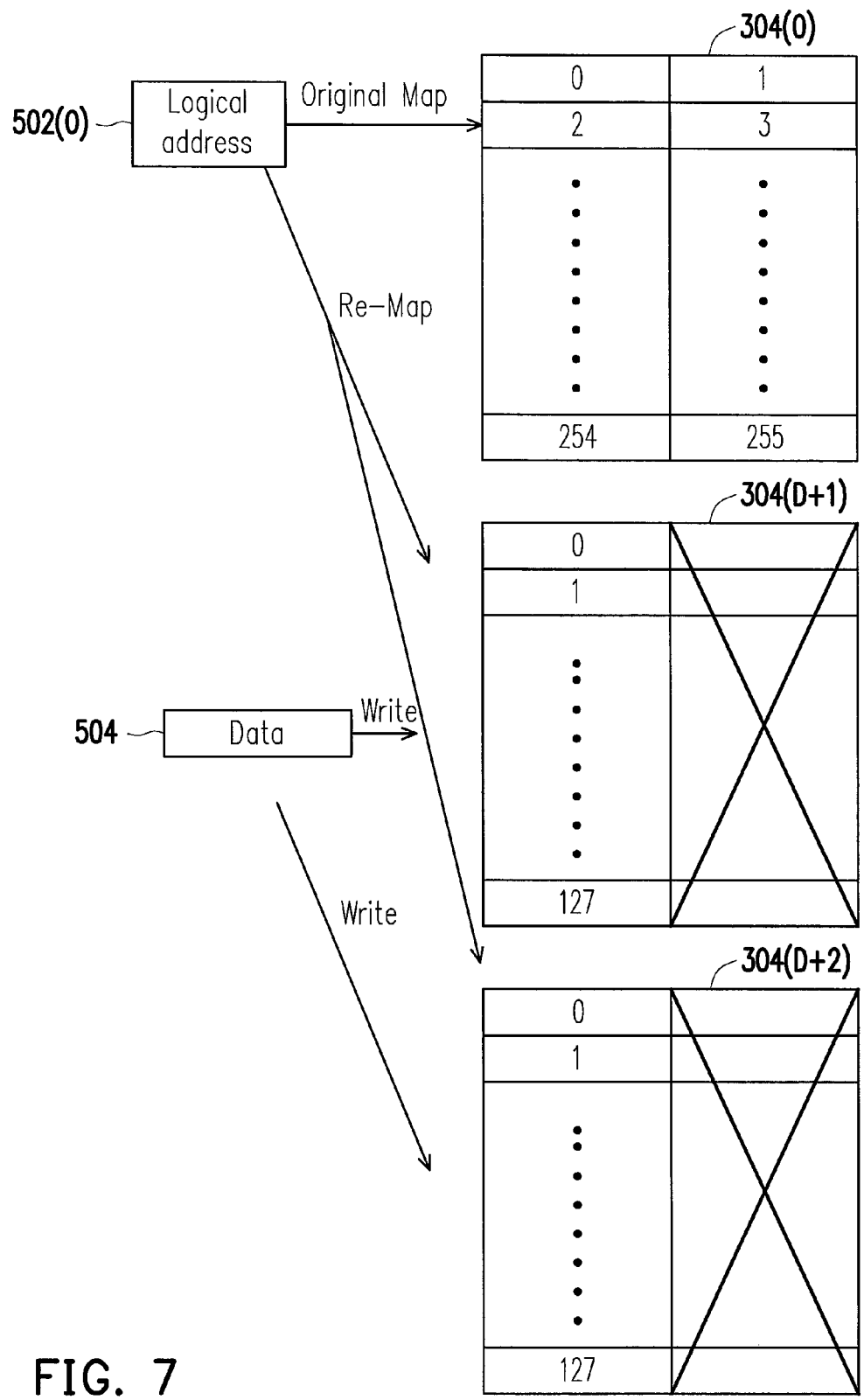
FIG. 7 is a diagram illustrating an example of a writing operation when the second physical erasing unit is not written in the first programming mode according to an exemplary embodiment.

FIG. 7 is a diagram illustrating an example of a writing operation while the second physical erasing unit is not written in the first programming mode.

Referring to FIG. 7, herein, assuming the memory management circuit 202 determines that the number of the spare physical erasing unit is not less than the second predetermined number, wherein the physical erasing units 304(D+1) and 304(D+2) (also referred to as a third physical erasing unit) are spare physical erasing units. On another hand, assuming that the logical address 502 is originally mapped to the physical erasing unit 304(0) at the point. The memory management circuit 202 writes the data 504 into the physical erasing units 304(D+1) and 304(D+2) in the first programming mode, and sets the physical erasing units 304(D+1) and 304(D+2) to be in the sequential writing state. Furthermore, the memory management circuit 202 also re-maps the logical address 502(0) which is originally mapped to the physical erasing unit 304(0) to the physical erasing units 304(D+1) and 304(D+2).

Figure 8:
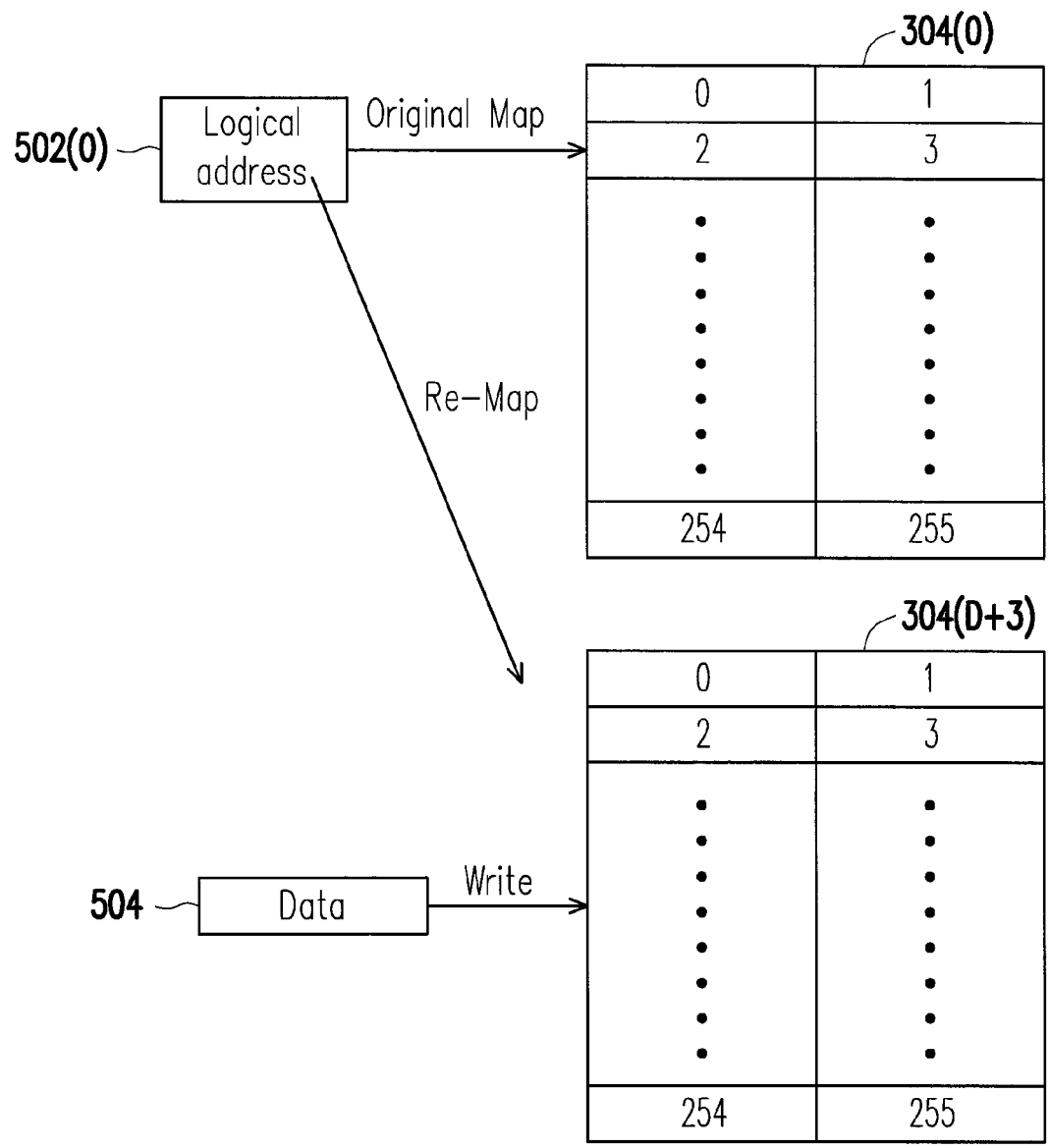
FIG. 8 is a diagram illustrating an example of the writing operation when the second physical erasing unit is not written in the first programming mode and the number of the spare physical erasing unit is less than the second predetermined number according to an exemplary embodiment.

FIG. 8 is a diagram illustrating an example of a writing operation when the second physical erasing unit is not written in the first programming mode and the number of the spare physical erasing unit is less than the second predetermined number.

Referring to FIG. 8, if the physical erasing unit 304(0) is in the sequential writing state, it is not been written in the first programming mode and the number of the spare physical erasing unit is less than the second predetermined number, the memory management circuit 202 further determines whether the number of the spare physical erasing unit is not less than the first predetermined number. Herein, assuming the number of the spare physical erasing unit is not less than the first predetermined number, and the physical erasing unit 304(D+3) (also referred to as a fifth physical erasing unit) is the spare erasing unit. The logical address 502(0) is originally mapped to the physical erasing unit 304(0). The memory management circuit 202 writes the data 504 into the physical erasing unit 304(D+3) in the second programming mode, and sets the physical erasing unit 304(D+3) to be in the sequential writing state. Furthermore, the memory management circuit 202 also re-maps the logical address 502(0) originally mapped to the physical erasing unit 304(0) to the physical erasing unit 304 (D+3). On another hand, if the number of the spare physical erasing unit is less than the first predetermined number, the memory management circuit 202 executes merging operation or writes the data to the spare physical programming units. However, the writing operation while the spare physical erasing units are insufficient is described above, it is omitted here.

When the physical erasing unit 304(0) is not in the sequential writing state, the memory management circuit 202 first determines whether the number of the spare physical erasing unit is less than the first predetermined number. If the number of the spare physical erasing unit is not less than the first predetermined number, the memory management circuit 202 selects a spare physical erasing unit (also referred to as a sixth physical erasing unit), and writes the data 504 to the sixth physical erasing unit in the second programming mode. However, the steps are similar to the example illustrated in FIG. 8, and descriptions below are explained with figures.

Figure 9A:
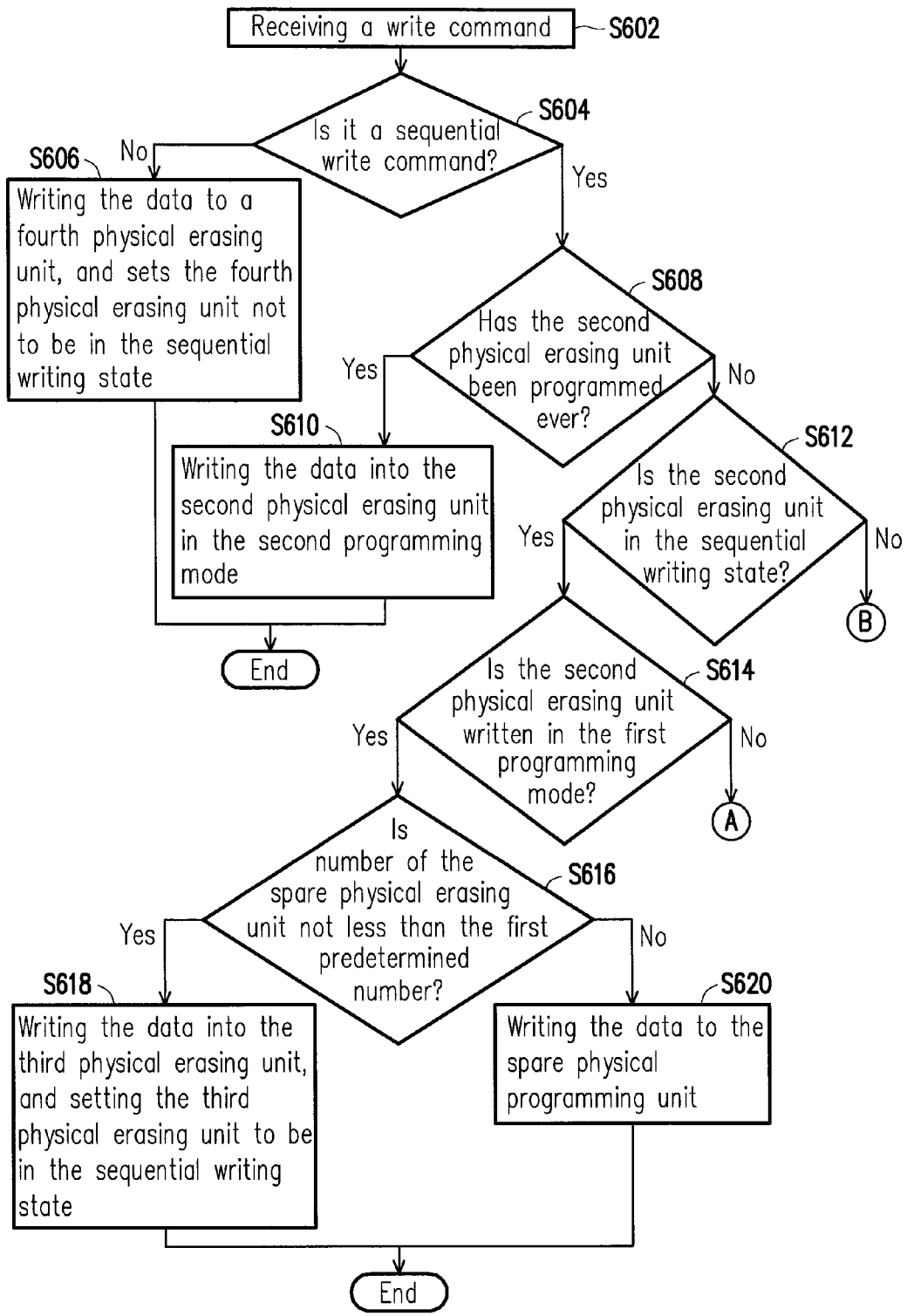
FIGS. 9A-9C are flow charts illustrating the data writing method according to an exemplary embodiment.
Figure 9B:
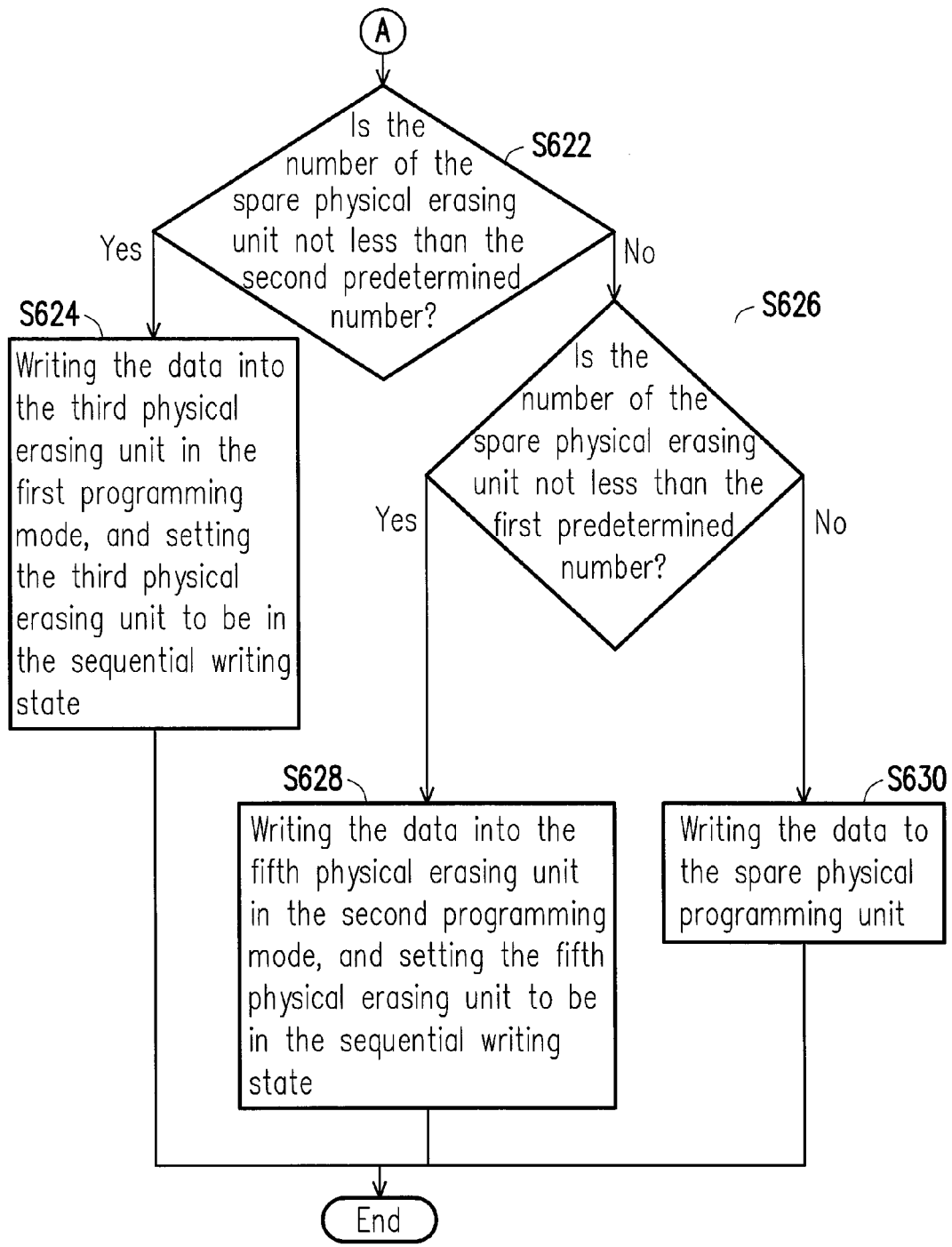
Figure 9C:
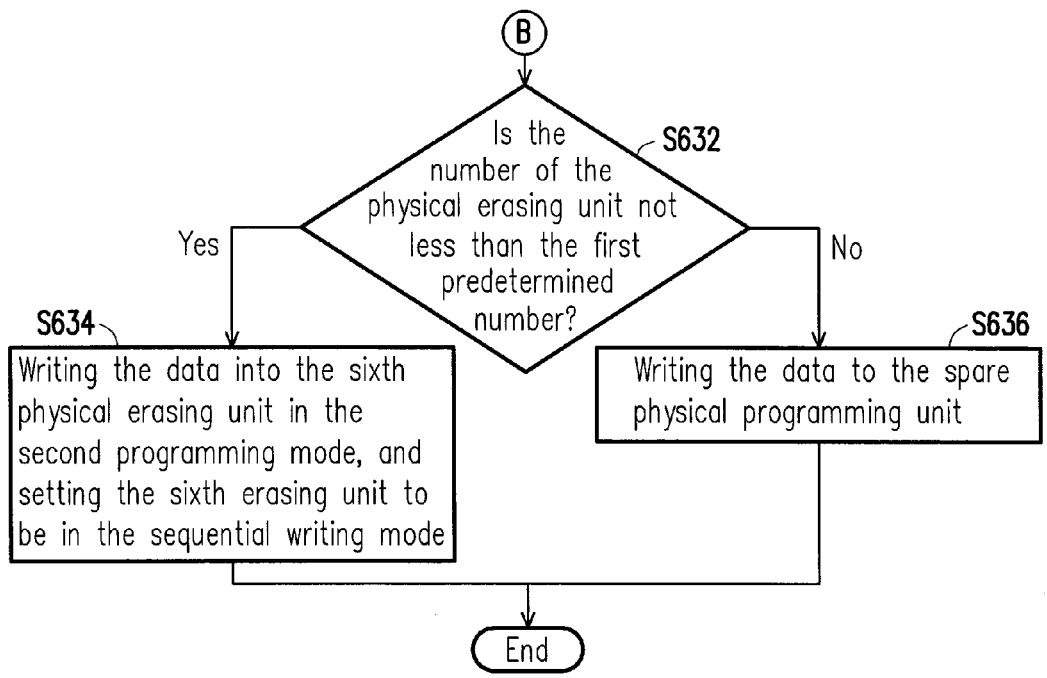

FIGS. 9A-9C are flow charts illustrating the data writing method according to an exemplary embodiment.

Referring to FIG. 9A, in step S602, the memory management circuit 202 receives a write command, and the write command instructs writing data to at least one logical address (also referred to as a first logical address). The first logical address is mapped to the second physical erasing unit.

In step S602, the memory management circuit 202 determines whether the received write command is a sequential write command.

If the received write command is not a sequential write command, in step S606, the memory management circuit 202 writes the data into a fourth physical erasing unit. In addition, the memory management circuit 202 sets the fourth physical erasing unit not to be in the sequential writing state.

If the received write command is the sequential write command, in step S608, the memory management circuit 202 determines whether the second physical erasing unit has not been programmed.

If the second physical erasing unit has not been programmed, in step S610, the memory management circuit 202 writes the data to the second physical erasing unit in the second programming mode.

If the second physical erasing unit has been programmed ever, in step S612, the memory management circuit 202 determines whether the second physical erasing unit is in the sequential writing state.

If the second physical erasing unit is in the sequential writing state, in step S614, the memory management circuit 202 determines whether the second physical erasing unit is written in the first programming mode.

If the second physical erasing unit is written in the first programming mode, in step S616, the memory management circuit 202 determines whether the number of the spare physical erasing unit is not less than the first predetermined number.

If the number of the spare physical erasing unit is not less than the first predetermined number, in step S618, the memory management circuit 202 selects a spare physical erasing unit (also referred to as a third physical erasing unit). The memory management circuit 202 writes the data into the third physical erasing unit in the first programming mode, and sets the third physical erasing unit to be in the sequential writing state.

If the number of the spare physical erasing unit is less than the first predetermined number, in step S620, the memory management circuit 202 writes the data to the spare physical programming units.

If the result of step S614 is "No", referring to FIG. 9B, in step S622, the memory management circuit 202 determines whether the number of the spare physical erasing unit is not less than the second predetermined number. If yes, in step S624, the memory management circuit 202 selects two third physical erasing units, writes the data into the third physical erasing units in the first programming mode, and sets the third physical erasing units to be in the sequential writing state.

If the result of step S622 is "No", in step S626, the memory management circuit 202 determines the number of the spare physical erasing unit is not less than the first predetermined number.

If the result of step S626 is "Yes", in step S628, the memory management circuit 202 writes the data into a fifth physical erasing unit in the second programming mode, and sets the fifth physical erasing unit to be in the sequential writing state.

If the result of step S626 is "No", in step S630, the memory management circuit 202 writes the data to the spare physical programming unit.

If the result of step S614 is "No", referring to FIG. 9C, in step S632, the memory management circuit 202 determines whether the number of the spare physical erasing unit is not less than the first predetermined number.

If the result of step S632 is "Yes", in step S634, the memory management circuit 202 writes the data into a sixth physical erasing unit in the second programming mode, and sets the sixth physical erasing unit to be in the sequential writing state.

If the result of step S632 is "No", in step S636, the memory management circuit 202 writes the data to the spare physical programming units.

In FIGS. 9A-9C, the memory management circuit 202 first determines whether the received write command is the sequential write command, and then determines whether to write the data in the first programming mode. In another exemplary embodiment, the memory management circuit 202 can predetermined that the received write commands are all sequential write commands, and the write command is not determined for whether or not it is the sequential write command.

Figure 10:
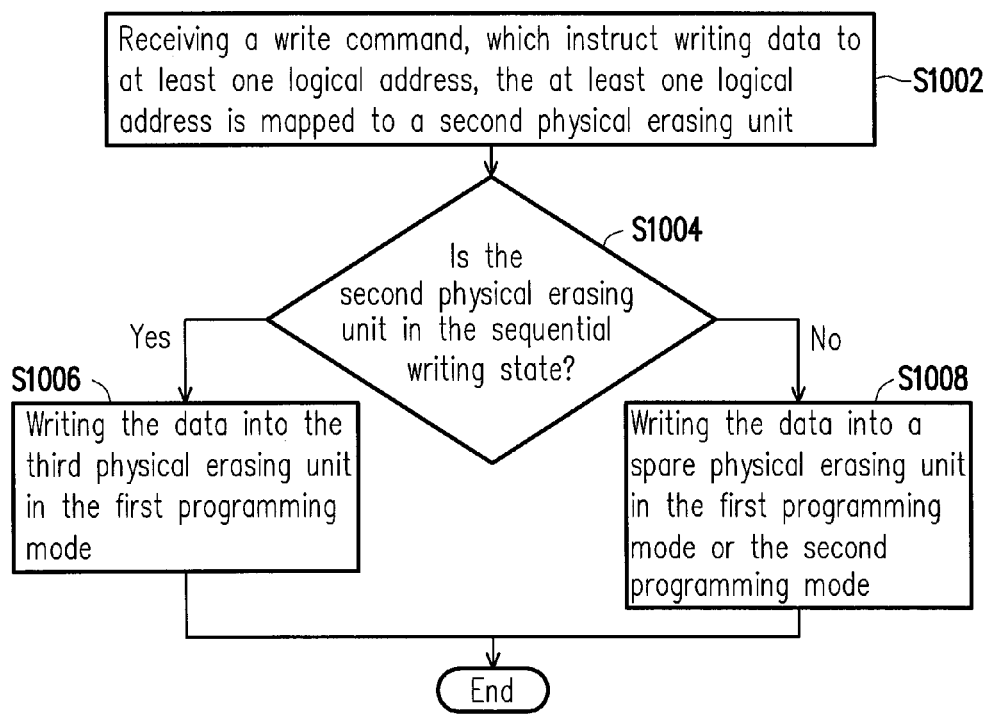
FIG. 10 is a flow chart illustrating the data writing method according to an exemplary embodiment.

FIG. 10 is a flow chart illustrating the data writing method according to another exemplary embodiment.

Referring to FIG. 10, in step S1002, the memory management circuit 202 receives a write command. The write command instructs writing data to at least one logical address, and the at least one logical address is mapped to a second physical erasing unit.

In step S1004, the memory management circuit 202 determines whether the second physical erasing unit is in the sequential writing state.

If the second physical erasing unit is in sequential writing state, in step S1006, the memory management circuit 202 writes the data into the third physical erasing unit in the first programming mode.

If the second physical erasing unit is not in the sequential writing state, in step S1008, the memory management circuit 202 writes the data to a spare physical erasing unit in the first programming mode or the second programming mode.

However, each step in FIG. 10 are described in detail previously, it is omitted here.

It should be appreciated that in another exemplary embodiment, the memory management circuit 202 logically partitions one or more physical erasing units into a physical unit, and the data are written to the physical unit according to whether the physical unit is in the sequential writing state. Specifically, a physical unit may include 2, 4 or 8 physical erasing units. However, the embodiment of the present invention is not limited thereto. When the physical programming units over a predetermined ratio in a physical unit are programmed sequentially within a predetermined time, the memory management circuit 202 determines that the physical unit is in the sequential writing state. On another hand, the memory management circuit 202 is able to partition one or more logical addresses to a logical unit, and a logical unit is mapped to a physical unit.

Alternatively, the data may be written by an interleaving method between the physical erasing units. When the interleaving method is utilized to write, the method for determining the sequential writing can be the interleaving method as well. For example, if the host system 1000 is to access a plurality of logical addresses with a plurality of serial numbers of 0-100, a physical erasing unit can be configured to store the data belonging to the logical addresses with the serial numbers of 0, 2, 4 . . . 100, and another physical erasing unit can be configured to store the logical addresses with the serial numbers of 1, 3, 5 . . . 99. With above situation, two physical erasing units may be in the sequential writing state, as to utilize the first programming mode to write data. However, the embodiment of the present invention is not limited thereto.

In summary, the exemplary embodiments of the present invention provide the data writing method, the memory controller and the memory management circuit, wherein the data writing rate is increased while the host system 1000 is writing the data to a certain logical area sequentially.

The previously described exemplary embodiments of the present invention have the advantages aforementioned, wherein the advantages aforementioned not required in all versions of the invention.

Although the present invention has been described with reference to the above embodiments, however, the present invention is not limited thereto. It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A data writing method for controlling a rewritable non-volatile memory module, wherein the rewritable non-volatile memory module comprises a plurality of physical erasing units, each of the physical erasing units comprises a plurality of physical programming unit groups, each of the physical programming unit groups comprises a plurality of physical programming units, the physical programming units of each of the programming unit groups comprise a lower physical programming unit and a upper physical programming unit, wherein a programming speed of the lower physical programming units is faster than a programming speed of the upper physical programming units, and a plurality of logical addresses is mapped to a plurality of first physical erasing units of the physical erasing units, the data writing method comprising:

receiving a first write command, which instructs writing data to at least one first logical address of the logical addresses, wherein the at least one first logical address is mapped to a second physical erasing unit in the first physical erasing units;

determining whether the second physical erasing unit is in a sequential writing state which represents that the physical programming units over a predetermined ratio in the second physical erasing unit have been programmed sequentially within a predetermined time; and writing the data into a third physical erasing unit of the physical erasing units in a first programming mode if the second physical erasing unit is in the sequential writing state, wherein the first programming mode represents that the upper programming units are non-programmable.

2. The data writing method as claimed in claim 1, wherein before the step of determining whether the second physical erasing unit is in the sequential writing state, the data writing method further comprising:

determining whether the first write command is a sequential write command, wherein the sequential write command represents that the at least one first logical address is after the logical address accessed by a second write command, and the second write command is received before the first write command.

3. The data writing method as claimed in claim 2, further comprising:

writing the data into the a fourth physical erasing unit of the physical erasing units if the first write command is not the sequential write command; and setting the fourth physical erasing unit not to be in the sequential writing state.

4. The data writing method as claimed in claim 1, wherein before the step of determining whether the second physical erasing unit is in the sequential writing state, the data writing method further comprising:

determining whether the second physical erasing unit has been written ever; and writing the data into the second physical erasing unit in a second programming mode if the second physical erasing unit has not been written ever, wherein the second programming mode represents that the upper physical programming units are programmable.

5. The data writing method as claimed in claim 1, wherein the step of writing the data to the third physical erasing unit of the physical erasing units in the first programming mode if the second physical erasing unit is in the sequential writing state comprises:

determining whether the second physical erasing unit is written in the first programming mode;

determining whether the number of a spare physical erasing unit in the physical erasing units is not less than a first predetermined number if the second physical erasing unit is written in the first programming mode; and writing the data into the third physical erasing unit in the first programming mode if the number of the spare physical erasing unit is not less than the first predetermined number; and setting the third physical erasing unit to be in the sequential writing state.

6. The data writing method as claimed in claim 1, wherein the step of writing the data into the third physical erasing unit in the first programming mode if the second physical erasing unit is in the sequential writing state comprises:

determining whether the second physical erasing unit is written in the first programming mode;

determining whether the number of a spare physical erasing unit is not less than a second predetermined number if the second physical erasing unit is not written in the first programming mode; and writing the data into the third physical erasing unit in the first programming mode and setting the third physical erasing unit to be in the sequential writing state if the number of the spare physical erasing unit is not less than the second predetermined number.

7. The data writing method as claimed in claim 6, further comprising:

determining whether the number of the spare physical erasing unit is not less than a first predetermined number if the number of a spare physical erasing unit is less than the second predetermined number, wherein the second predetermined number is greater than the first predetermined number;

writing the data into a fifth physical erasing unit of the physical erasing units in a second programming mode if the number of the spare physical erasing unit is not less than the first predetermined number, wherein the second programming mode represents that the upper physical programming units are programmable; and setting the fifth physical erasing unit to be in the sequential writing state.

8. The data writing method as claimed in claim 1, further comprising:

determining whether the number of a spare physical erasing unit of the physical erasing units is not less than a first predetermined number if the second physical erasing unit is not in the sequential writing state;

writing the data into a sixth physical erasing unit of the physical erasing units in a second programming mode if the number of the spare physical erasing unit is not less than the first predetermined number, wherein the second programming mode represents that the upper physical programming units are programmable; and setting the sixth physical erasing unit to be in the sequential writing state.

9. A memory storage device, comprising:

a connector, configured to couple to a host system;

a rewritable non-volatile memory module, comprising a plurality of physical erasing units, wherein each of the physical erasing units comprises a plurality of physical programming unit groups, each of the physical programming unit groups comprises a plurality of physical programming units, and the physical programming units of each of the physical programming unit groups comprise a lower physical programming unit and a upper programming unit, wherein a programming speed of the lower physical programming unit is faster than a programming speed of the upper physical programming unit, and a plurality of logical addresses is mapped to a plurality of first physical erasing units of the physical erasing units; and a memory controller, coupled to the connector and the rewritable non-volatile memory module, configured to receive a first write command, wherein the first write command instructs writing data to at least one first logical address of the logical addresses, and the at least one first logical address is mapped to a second physical erasing unit of the first physical erasing units, the memory controller is further configured to determine whether the second physical erasing unit is in a sequential writing state, wherein the sequential writing state represents that the physical programming units over a predetermined ratio in the second physical erasing unit have been programmed sequentially within a predetermined time, the memory controller is further configured to write the data into a third physical erasing unit of the physical erasing unit in a first programming mode if the second physical erasing unit is in the sequential writing state, wherein the first programming mode represents that the upper physical programming units are non-programmable.

10. The memory storage device as claimed in claim 9, wherein the memory controller is further configured to determine whether the first write command is a sequential write command, wherein the sequential write command represents that the at least one first logical address is after the logical addresses accessed by a second write command, and the second write command is received by the memory controller before the first write command.

11. The memory storage device as claimed in claim 10, wherein if the first write command is not the sequential write command, the memory controller is further configured to write the data into a fourth physical erasing unit of the physical erasing units, and set the fourth physical erasing unit not to be in the sequential writing state.

12. The memory storage device as claimed in claim 9, wherein the memory controller is further configured to determine whether the second physical erasing unit has been written ever, if the second physical erasing unit has not been written ever, the memory controller is configured to write the data into the second physical erasing unit in a second programming mode, wherein the second programming mode represents that the upper physical programming units are programmable.

13. The memory storage device as claimed in claim 9, wherein the memory controller is further configured to determine whether the second physical erasing unit is written in the first programming mode, if the second physical erasing unit is written in the second physical erasing unit, the memory controller is further configured to determine whether the number of a spare physical erasing unit of the physical erasing units is not less than a first predetermined number, if the number of the spare physical erasing unit is not less than the first predetermined number, the memory controller is further configured to write the data into the third physical erasing unit in the first programming mode, and set the third physical erasing unit to be in the sequential writing state.

14. The memory storage device as claimed in claim 9, wherein the memory controller is further configured to determine whether the second physical erasing unit is written in the first programming mode, if the second physical erasing unit is not written in the first programming mode, the memory controller is further configured to determine whether the number of a spare physical erasing unit of the physical erasing units is not less than a second predetermined number, if the number of the spare physical erasing unit is not less than the second predetermined number, the memory controller is further configured to write the data into the third physical erasing unit in the first programming mode, and set the third physical erasing unit to be in the sequential writing state.

15. The memory storage device as claimed in claim 14, wherein if the number of the spare physical erasing unit is less than the second predetermined number, the memory controller is further configured to determine whether the number of the spare physical erasing unit is less than a first predetermined number, wherein the second predetermined number is greater than the first predetermined number, if the number of the spare physical erasing unit is not less than the first predetermined number, the memory controller is further configured to write the data into a fifth physical erasing unit of the physical erasing units in the second programming mode, wherein the second programming mode represents that the upper physical programming units are programmable, the memory controller is further configured to set the fifth physical erasing unit to be in the sequential writing state.

16. The memory storage device as claimed in claim 9, wherein if the second physical erasing unit is not in the sequential writing state, the memory controller is further configured to determine whether the number of a spare physical erasing unit of the physical erasing units is not less than a first predetermined number, if the number of the spare physical erasing unit is not less than the first predetermined number, the memory controller is configured to write the data into a sixth physical erasing unit of the physical erasing units, and set the sixth physical erasing unit to be in the sequential writing state.

17. A memory controller for controlling a rewriteable non-volatile memory module, the memory controller comprises:

a host interface, configured to couple to a host system;

a memory interface, configured to couple to the rewriteable non-volatile memory module, wherein the rewriteable non-volatile memory module comprises a plurality of physical erasing units, each of the physical erasing units comprises a plurality of physical programming unit groups, each of the physical programming unit groups comprises a plurality of physical programming units, and the physical programming units of each of the physical programming unit groups comprises a lower physical programming unit and a upper programming unit, wherein a programming speed of the lower physical programming unit is faster than a programming speed of the upper physical programming unit, and a plurality of logical addresses is mapped to a plurality of first physical erasing units of the physical erasing units; and a memory management circuit, coupled to the host interface and the memory interface, configured to receive a first write command, wherein the first write command instructs writing data to at least one first logical address of the logical addresses, and the at least first logical address is mapped to a second physical erasing unit of the first physical erasing units, the memory controller is further configured to determine whether the second physical erasing unit is in a sequential writing state, wherein the sequential writing state represents that the physical programming units over a predetermined ratio in the second physical erasing unit has been programmed sequentially within a predetermined time, if the second physical erasing unit is in the sequential writing state, the memory controller is further configured to write the data into a third physical erasing unit of the physical erasing units in a first programming mode, wherein the first programming mode represents that the upper physical programming units are non-programmable.

18. The memory controller as claimed in claim 17, wherein the memory management circuit is further configured to determine whether the first write command is a sequential write command, wherein the sequential write command represents that the at least one first logical address is after the logical address accessed by a second write command, and the second write command is received before the first write command by the memory management circuit.

19. The memory controller as claimed in claim 18, wherein if the first write command is not the sequential write command, the memory management circuit is configured to write the data into a fourth physical erasing unit of the physical erasing units, and set the fourth physical erasing unit not to be in the sequential writing state.

20. The memory controller as claimed in claim 17, wherein the memory management circuit is further configured to deteimine whether the second physical erasing unit has been written ever,
if the second physical erasing unit has not been written ever, the memory management circuit is further configured to write the data into the second physical erasing unit in a second programming mode, wherein the second programming mode represents that the upper physical programming units are programmable.

21. The memory controller as claimed in claim 17, wherein the memory management circuit is further configured to determine whether the second physical erasing unit is written in the first programming mode,
if the second physical erasing unit is written in the first programming mode, the memory management circuit is further configured to determine whether the number of a spare physical erasing unit is not less than a first predetermined number,
if the number of the spare erasing unit is not less than the first predetermined number, the memory management circuit is further configured to write the data into the third physical erasing unit in the first programming mode, and set the third physical erasing unit to be in the sequential writing state.

22. The memory controller as claimed in claim 17, wherein the memory management circuit is further configured to determine whether the second physical erasing unit is written in the first programming mode,
if the second physical erasing unit is not written in the first programming mode, the memory management circuit is further configured to determine whether the number of a spare physical erasing unit of the physical erasing units is not less than a second predetermined number,
if the number of the spare physical erasing unit is not less than the second predetermined number, the memory management circuit is further configured to write the data into the third physical erasing unit in the first programming mode, and set the third physical erasing unit to be in the sequential writing state.

23. The memory controller as claimed in claim 22, wherein if the number of the spare physical erasing unit is less than the second predetermined number, the memory management circuit is further configured to determine whether the number of the spare physical erasing unit is less than a first predetermined number, wherein the second predetermined number is greater than the first predetermined number,
if the number of the spare physical erasing unit is not less than the first predetermined number, the memory management circuit is configured to write the data into a fifth physical erasing unit of the physical erasing units in the second programming mode, wherein the second programming mode represents that the upper physical programming units are programmable,
wherein the memory controller is further configured to set the fifth physical erasing unit to be in the sequential writing state.

24. The memory controller as claimed in claim 17, if the second physical erasing unit is not in the sequential writing state, the memory controller is further configured to determine whether the number of a spare physical erasing unit of the physical erasing units is not less than a first predetermined number,
if the number of the spare physical erasing unit is not less than the first predetermined number, the memory controller is configured to write the data into a sixth physical erasing unit of the physical erasing units in the second programming mode, and set the sixth physical erasing unit to be in the sequential writing state.

* * * * *